United States Patent [19]

Hamann et al.

[11] Patent Number: 4,998,053
[45] Date of Patent: Mar. 5, 1991

[54] METHOD AND APPARATUS FOR REDUCING A CURRENT BREAK IN A LEG THAT IS NOT PARTICIPATING IN THE COMMUTATION OF A THREE-PHASE BLOCK CURRENT FED SYNCHRONOUS MACHINE

[75] Inventors: Jens Hamann, Fuerth-Stadeln; Hartmut Vogt, Herzogenaurach, both of Fed. Rep. of Germany

[73] Assignee: Siemens Aktiengesellschaft, Berlin & Munich, Fed. Rep. of Germany

[21] Appl. No.: 338,955

[22] Filed: Apr. 14, 1989

[30] Foreign Application Priority Data

Jul. 11, 1988 [DE] Fed. Rep. of Germany ....... 3823499

[51] Int. Cl.⁵ .................. H02P 5/40; H02K 19/10
[52] U.S. Cl. .................................................. 318/723
[58] Field of Search .............................. 318/721–723, 318/138, 254

[56] References Cited

U.S. PATENT DOCUMENTS

| | | | |
|---|---|---|---|
| 4,565,956 | 1/1986 | Zimmermann et al. | 318/721 |
| 4,581,569 | 4/1986 | Fujioka et al. | 318/811 |
| 4,714,878 | 12/1987 | Steinigweg | 324/158 |
| 4,761,599 | 8/1988 | Yasunobo et al. | 318/723 |
| 4,777,414 | 10/1988 | Storath et al. | 318/722 |

FOREIGN PATENT DOCUMENTS

0085541 8/1983 European Pat. Off. .
0104909 4/1984 European Pat. Off. .

*Primary Examiner*—David Smith, Jr.
*Attorney, Agent, or Firm*—Kenyon & Kenyon

[57] ABSTRACT

A method for reducing a current break in a leg of a three-phase block current-fed synchronous machine that is not participating in a commutation while the currents in the other two legs are commutating. A triangular high frequency sampling voltage from a pulse frequency generator of a control unit for the converter that feeds the synchronous machine is always shorted at the beginning of the commutation for a predetermined synchronization time. The torque ripple of a three-phase feed drive is reduced using this method and the circuit arrangement for carrying out the method.

7 Claims, 5 Drawing Sheets

METHOD AND APPARATUS FOR REDUCING A CURRENT BREAK IN A LEG THAT IS NOT PARTICIPATING IN THE COMMUTATION OF A THREE-PHASE BLOCK CURRENT FED SYNCHRONOUS MACHINE

BACKGROUND OF THE INVENTION

The present invention relates to a method for reducing a current break in a leg, not participating in the commutation, of a three-phase current block-fed synchronous machine while the leg currents of the two other legs are commutating. The present invention also relates to a circuit arrangement for carrying out the method.

A synchronous machine with trapezoidal electromotive force (EMF) generates a constant torque when fed with block or square wave shaped currents. For this reason, such a machine is employed in three phase feed drives. The block shaped currents are generated by means of a converter. A rotating field is generated in the machine by means of a control unit and a control voltage. In addition, the torque is proportional to the machine current. It has been found that breaks in the torque are caused by current breaks in a leg not participating in the commutation during the commutation of the other two leg currents of the three phase block current fed synchronous machine. These breaks are particularly noticeable at low speeds.

SUMMARY OF THE INVENTION

The present invention relates to a method for reducing a current break in a leg, not participating in the commutation, of a three phase block current fed synchronous machine while the other two leg currents in the other two legs are being commutated. The present invention also relates to a circuit arrangement for carrying out the method that can substantially reduce the torque ripple of a block current fed synchronous machine.

According to the present invention, the problem described above is solved by always short circuiting a triangular high-frequency sampling voltage at the beginning of the commutation for a predetermined synchronizing time. The sampling voltage is supplied by a pulse frequency generator of a control unit for a converter that supplies the synchronous machine.

The currents in the legs that do not participate in the commutation do not uniformly commutate up or down because different voltage values are present for commutation in the up or down commutating legs. For example, the voltage can be zero volts, ⅓ of the intermediate link voltage value, or ⅔ of the intermediate link voltage value or the electromotive force EMF. While the current in the down commutating leg is already zero, the up commutating current has reached at this instant, for example, only 50% of its reference value. As a result, the current in the leg not participating in the commutation has different breaks which cause the total current, and hence the waveform of the torque, to ripple.

The commutation depends on the driving voltage at the legs which itself depends on the pulse pattern that the control unit feeds to the converter. Shorting the triangular high-frequency sampling voltage for a predetermined synchronizing time at the start of the commutation achieves the result that the high frequency sampling voltage always starts with zero volts. The control unit of the converter feeding the synchronous machine generates the same pulse pattern at the beginning of commutation. The result is that the current breaks in the leg not participating in the commutation are all equal and have diminished.

The predetermined synchronizing time depends on the charge of a capacitor of the integrator of the pulse frequency generator. The capacitor must be discharged within this predetermined synchronizing time so that the triangular high-frequency sampling voltage can start at zero volts every time. The triggering state of the Schmitt trigger belonging to the integrator, i.e., whether a positive or negative voltage is present at the output of the Schmitt trigger, depends on whether the sampling voltage, starting from zero volts, starts with a negative or positive slope.

The control unit achieves the following pulse pattern by simple synchronization at the beginning of each communication independent of the direction of the current of the synchronous machine: "drive via the leg which is not participating in the commutation, and the leg to which the commutation takes place", "upper bypass" and "lower bypass", respectively. All current breaks thus have the same amplitude in the leg not participating in the commutation. This amplitude is further decreased from the current breaks without synchronization.

In a further advantageous process step, a negative voltage is applied to the Schmitt trigger for a positive control voltage and a positive voltage is applied to the Schmitt trigger for a negative control voltage. Due to this pulse pattern applied to the converter and the voltages thereby present at the legs of the synchronous machine (⅓ of the value of the intermediate link voltage at the leg commutating down and the electromotive force) the current change proceeds slowly and independently of the current direction of the synchronous machine, whereby the subordinate current controller has the opportunity to have an effect on the commutation.

Thus, all the current breaks in the leg that is not participating in the commutation have the same amplitude and decrease further in amplitude from the current breaks obtained with simple synchronization.

An advantageous circuit arrangement for carrying out the method uses a synchronous machine that is fed with block current and is equipped with a converter, a tachometer generator, a rotor position transmitter, a speed controller and a current controller. The output of the current controller is connected to the input of a control unit of the converter and the output of the rotor position transmitter is connected to a commutation indicator. The output of the commutation indicator is connected to a synchronization stage, the output of which is tied to the pulse frequency generator of the control unit.

This circuit arrangement begins each commutation with a high-frequency triangular sampling voltage of the pulse frequency generator that always starts from zero volts and has a negative or positive slope independent of the direction of the current direction of the synchronous machine. The beginning of the commutation is determined from the available position signals by means of a known circuit arrangement. Thus, the present invention obtains a circuit arrangement by which the torque ripple can be reduced.

One advantageous circuit arrangement connects the output of the current controller to a sign indicator. A switch connects an output of the sign indicator to the output of the pulse frequency generator of the control unit. The switch can be controlled by the synchronization stage. This circuit arrangement produces a triangular high frequency sampling voltage that always starts with zero volts at the beginning of each commutation independent of the current direction of the synchronous machine. The sampling voltage initially has a negative or positive slope for a positive or negative control voltage, respectively. The control unit thus generates the triangular high-frequency sampling voltage independent of the direction of the current of the synchronous machine. The sampling voltage always starts from zero volts. The sampling voltage initially has a negative or positive slope for a positive or negative control voltage, respectively. The control units thereby generates the same pulse pattern at the beginning of each commutation independent of the current direction of the synchronous machine. The current change thus proceeds slowly so that the subordinate current controller can have an effect on the current change. A circuit arrangement is thereby obtained by which the torque ripple can be substantially reduced.

A further advantageous circuit arrangement has an EXNOR gate provided at the synchronization stage. Both inputs of the EXNOR gate are tied to the output of the commutation indicator. A time delay unit is connected in series with one of the inputs. The output of the EXNOR gate acts on a switch that is electrically connected in parallel to a capacitor belonging to an integrator of the pulse frequency generator. A synchronization member of particularly simple design is thereby obtained in which the time delay unit determines a synchronization time during which the capacitor of the integrator of the pulse frequency generator is discharged. The triangular, saw-tooth shaped wave form of the high frequency sampling voltage can thus begin at zero volts.

Another embodiment of the circuit arrangement has the output of the EXNOR gate acting on a switch via a negatively flank-triggered monostable multivibrator. The input to the switch is connected to the sign indicator and the output of the switch is connected to an input of the Schmitt trigger of the pulse frequency generator. It is thereby achieved that the triangular high frequency sampling voltage begins with a positive or negative slope after it is set to zero, depending on the sign of the control voltage. The control unit thereby generates the same pulse pattern at the beginning of each commutation. The torque ripple is thus considerably reduced.

DETAILED DESCRIPTION

Figure 1:
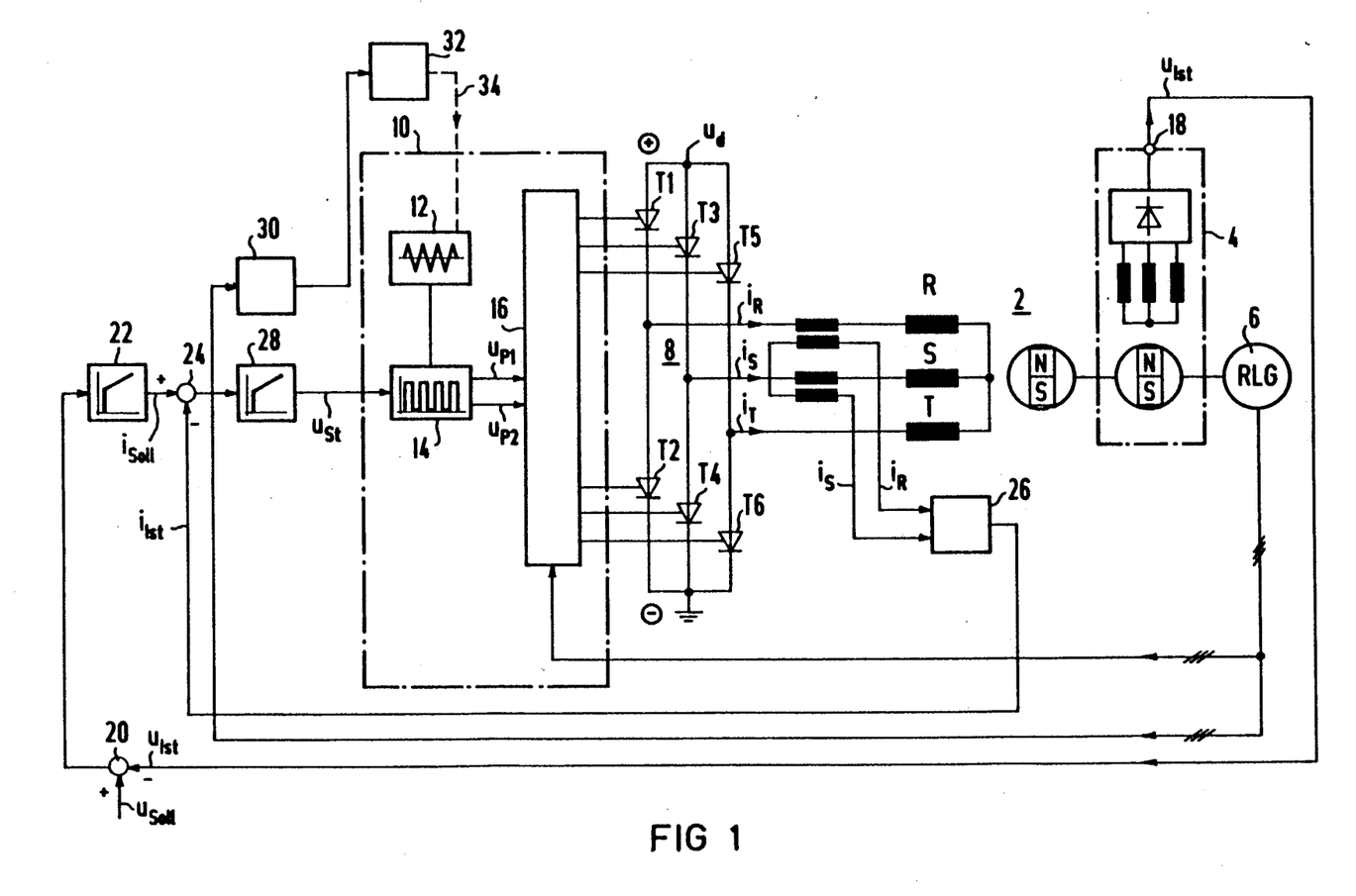
FIG. 1 shows a circuit arrangement for carrying out the method according to the present invention.

FIG. 1 shows a synchronous machine 2 with a tachometer generator 4 and a rotor position transmitter 6 connected thereto. The stator legs R, S and T of the synchronous machine 2 are connected to a converter 8 which is designed as a 6-pulse bridge circuit with semiconductor valves T1 to T6. The bypass diodes are not shown to clarify the drawing. The firing signals for the semiconductor valves T1 to T6 of the converter 8 are generated as a function of a control voltage $u_{St}$ in a control unit 10. Control unit 10 contains a pulse frequency generator 12 which furnishes a triangular high frequency sampling voltage $u_D$, a pulse width modulator 14 and a pulse distribution logic circuit 16. The pulse frequency generator 12 can also be provided with generators which furnish a saw tooth voltage or an asymmetrical triangular voltage as the sampling voltage. The pulse width modulator 14 generates two pulse width modulated signals $u_{P1}$ and $u_{P2}$ from the control voltage as the sampling voltage. These signals are fed to the pulse distribution logic circuit 16. The pulse width modulated signals $u_{P1}$ and $u_{P2}$ are then converted into a pulse pattern. The control signals are then distributed over the control inputs of the semiconductor valves T1 to T6 depending on the pulse pattern.

The synchronous machine 2 shown in FIG. 1 has a speed control with subordinate current control. The speed of the synchronous machine 2 is determined by means of the tachometer generator 4. The output 18 of the tachometer generator 4 is a speed-proportional voltage $u_{Ist}$ representing the actual speed value. This actual speed value $u_{Ist}$ is fed to the inputs of a comparator 20 that has two inputs. The actual value $u_{Ist}$ of the speed n is present at the negative input and the reference value $u_{Soll}$ is present at the positive input. The output of comparator 20 is a control difference or speed difference which is fed to a speed controller 22, for which purpose a PI controller is provided. A current reference value $i_{Soll}$ can be taken off at the output of this speed controller 22. The current reference value $i_{Soll}$ is fed to a second comparator 24 that has two inputs. The current reference value $i_{Soll}$ is present at the positive input of comparator 24 and an actual current value $i_{Ist}$ is fed to the negative input of comparator 24. The current reference value $i_{Ist}$ is formed from two leg currents $i_R$ and $i_S$ by means of a device 26 for forming current reference values. The construction of device 26 for forming current reference values in a three phase block current fed motor is known from German Offenlegungsschrift No. DE 36 16 208 A1. The control difference or current difference of this second comparator 24 is fed to a current controller 28. The current controller is also a PI controller. Its output is the control voltage $U_{St}$ for the control unit 10.

The rotor position generator 6 generates three binary position signals that are shifted in phase by 120° relative to each other and are synchronized with the block current of the synchronous machine 2. The start of the commutation is determined by means of these position signals and a commutation determining device 30 which can be a simple electronic evaluation circuit for the flanks of the position signals. The output of commutation determining device 30 is electrically connected to a synchronization stage 32 which is described in greater detail in FIG. 3. The output of synchronizing stage 32 is connected by means of an function line 34, shown as a dashed line 34, to the pulse frequency generator 12. This pulse frequency generator 12 is explained in greater detail in FIG. 4.

Figure 2:
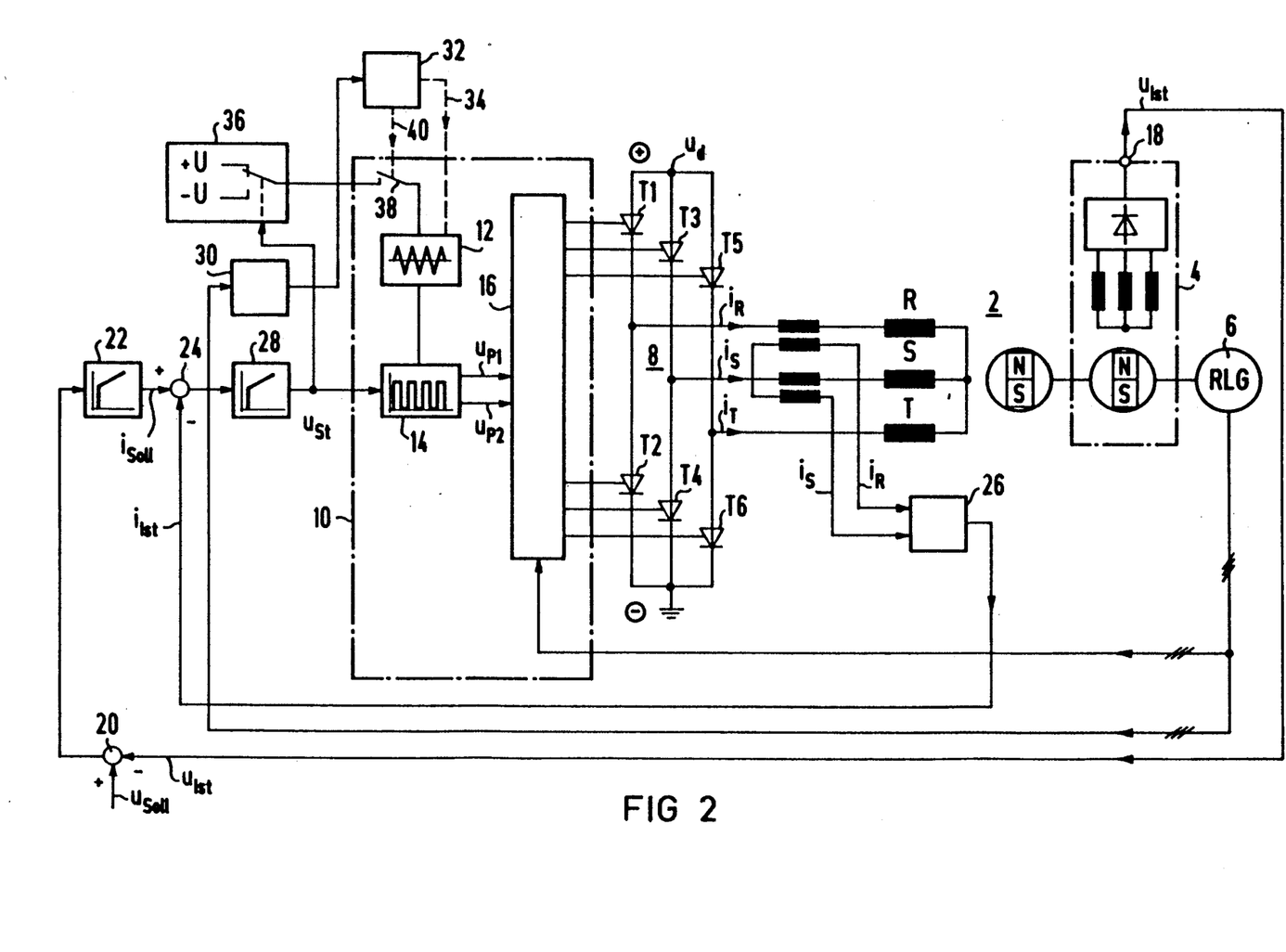
FIG. 2 shows an alternate embodiment of the circuit arrangement for the present invention according to FIG. 1.

FIG. 2 shows another embodiment of an advantageous circuit arrangement according to FIG. 1. The difference between the two embodiments of the circuit arrangements shown in FIGS. 1 and 2 is that the output of the current controller 28 is additionally connected to a sign indicator 36 at the output of which a voltage +U or −U is present. This voltage is fed to the pulse frequency generator 12 of the control unit 10 via switch 38. This switch is tied by means of a further function line 40, shown as a dashed line, to the synchronizing stage 32. All other components of this circuit arrangement are identical with the components of the circuit arrangement shown in FIG. 1. The components in FIG. 1 therefore also have the same reference numbers in FIG. 2

Figure 3:
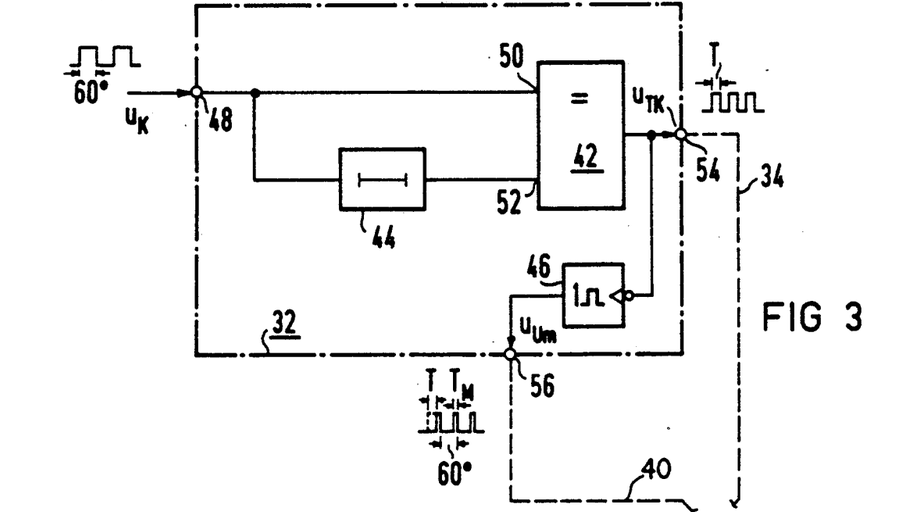
FIG. 3 shows a synchronization stage.

FIG. 3 shows one possible embodiment of the synchronizing stage 32. The synchronizing stage 32 contains an EXNOR gate 42, a time delay stage 44 and a negatively flank triggered monostable multivibrator 46. The input 48 of the synchronizing stage 32 receives squarewave signal $u_K$ generated by the commutation indicator 30. The level of squarewave signal $u_K$ changes every 60°. Squarewave signal $u_K$ is fed directly to a first input 50 of the EXNOR gate 42 and to a second input 52 of the EXNOR gate 42 via the time delay stage 44. A squarewave signal $u_{TK}$ is present at the output 54 of the EXNOR gate 42. The level goes to a logical "1" for a predetermined time period every 60°. This time period T is also called the synchronizing time T. The synchronizing time T is made so that the entire charge of the capacitor of the integrator of the pulse frequency generator 12 can discharge. The squarewave signal $u_{TK}$ is fed to the pulse frequency generator 12 by means of the function line 34 as shown in FIGS. 1 and 2. In addition, the squarewave signal $u_{TK}$ is fed to a second output 56 via the negatively flank triggered monostable multivibrator 46. A squarewave signal $u_{Um}$ is present at output 56. Every negative flank of the squarewave signal $u_{TK}$ sets the monostable multivibrator 46, i.e., a logical "1" appears at its output. A logical "0" again appears at the output of multivibrator 46 after a predetermined time $T_M$ specific to the multivibrator 46 has elapsed. This squarewave signal $u_{Um}$ is fed to the switch 28 by means of the function line 40 as shown in FIG. 2.

Figure 4:
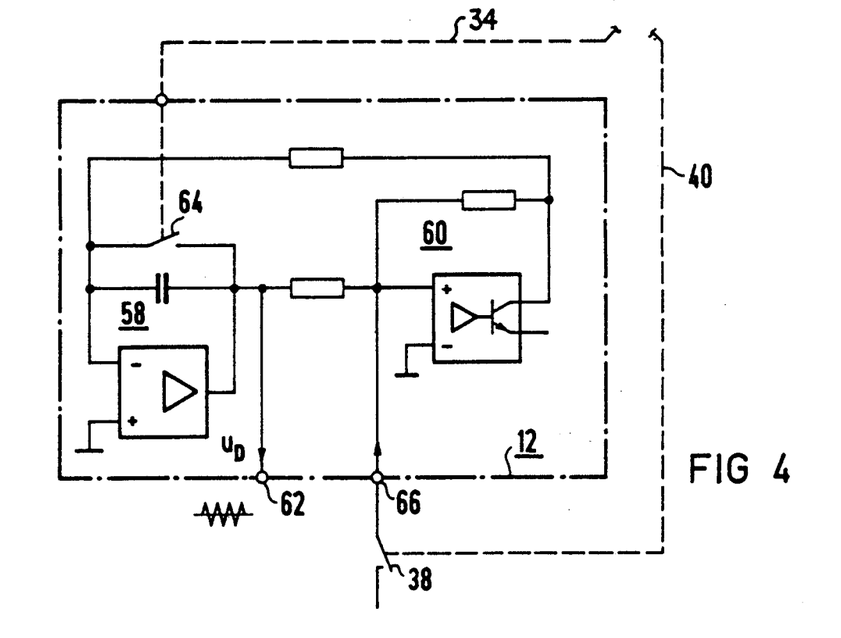
FIG. 4 shows a pulse frequency generator for the control unit.

FIG. 4 shows one possible embodiment of the pulse frequency generator 12 that can, for example, be adapted from the book "Halbleiter-Schaltungstechnik" by U. Tietze and C. H. Schenk, 6th Edition, 1983, pages 461 to 469. The pulse frequency generator 12 contains an integrator 58 followed by a Schmitt trigger 60. A triangular high-frequency sampling voltage $u_D$ is available at the output 62 of the integrator 58. The capacitor of integrator 58 is electrically shunted by switch 64 which can be actuated by the synchronizing stage 32 via function line 34. The electrically shunted capacitor is discharged as soon as the switch 64 is closed. The sampling voltage at the output 62 begins at zero volts and has a positive or negative slope depending on the output voltage of the Schmitt trigger 60. If, for instance, the switch 64 is closed during a down integration, a positive voltage is present at the output of the Schmitt trigger 60 as long as the switch off level is not reached. The sampling voltage thus begins from zero volts with a negative slope after the switch 64 is opened.

So that the slope with which the sampling voltage begins is not left to chance, a positive or negative voltage +U or −U is fed via an input 66 starting from zero volts. The amplitudes of these voltages +U and −U are equal and correspond to the amplitudes of the switch on or switch off level of the Schmitt trigger 60. These voltages +U and −U are fed to the Schmitt trigger only when the switch 64 is again closed. Schmitt trigger 60 is thereby imparted with a switch on or switch off level. The sampling voltage $u_D$ starts from zero volts with a negative or positive slope as soon as the switch 64 is opened. The voltages +U and −U are generated by the sign indicator 36 as a function of the polarity of the control unit $u_{St}$ and fed to the input 66 of the Schmitt trigger 60 via switch 38. Synchronizing stage 32 can control switch 38 by means of function line 40. Thus, for a positive sign of the control voltage $u_{St}$, the voltage +U is fed from the sign indicator 36 to the pulse frequency generator 12 via the switch 38 so that the sampling voltage $u_D$ begins with a negative slope starting from zero volts at the start of every commutation.

Figure 6:
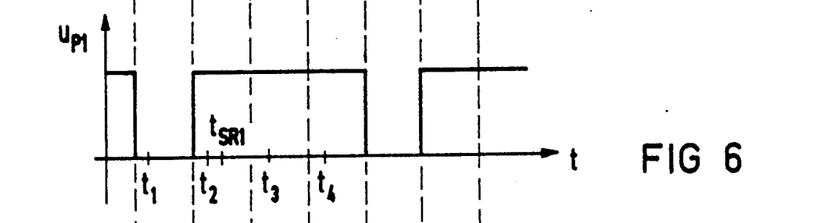
FIGS. 6, 7, 10 and 11 show a plot of the pulse width modulated control voltages versus time.
Figure 7:
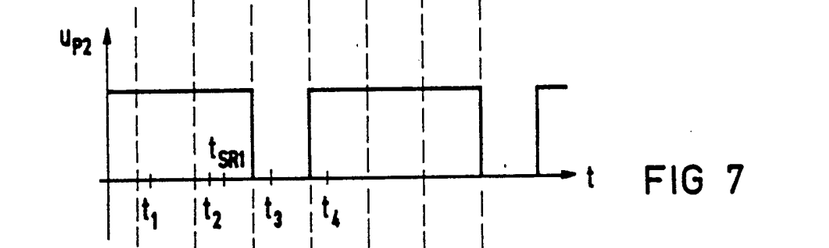
Figure 8:
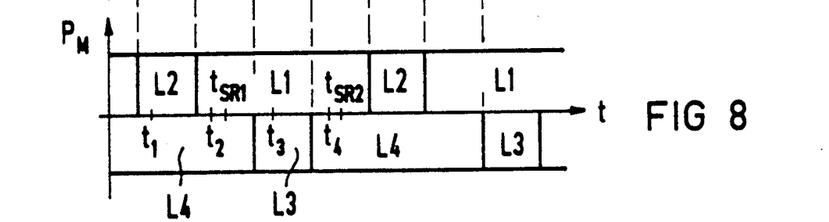
FIGS. 8 and 12 show a plot of the pulse pattern generated.
Figure 9:
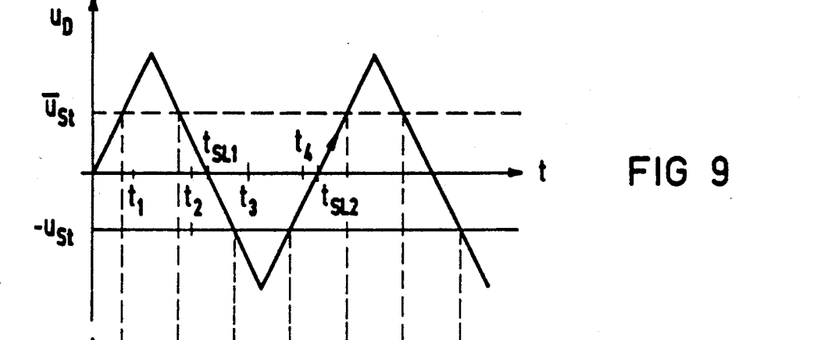
Figure 10:
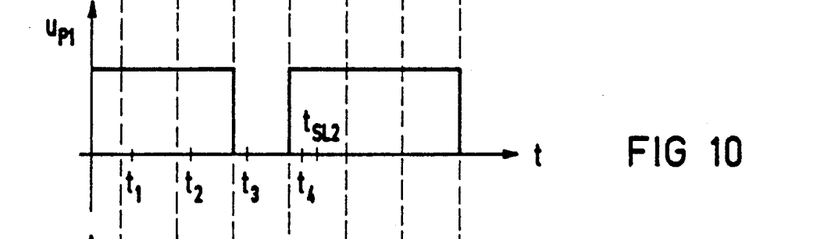
Figure 11:
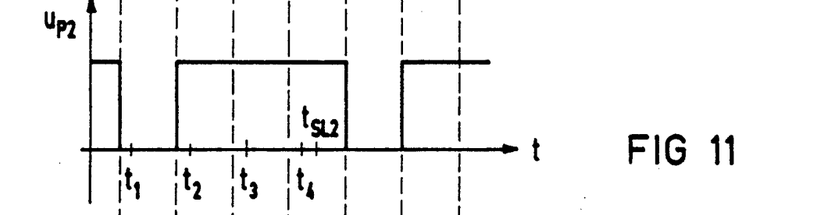
Figure 12:
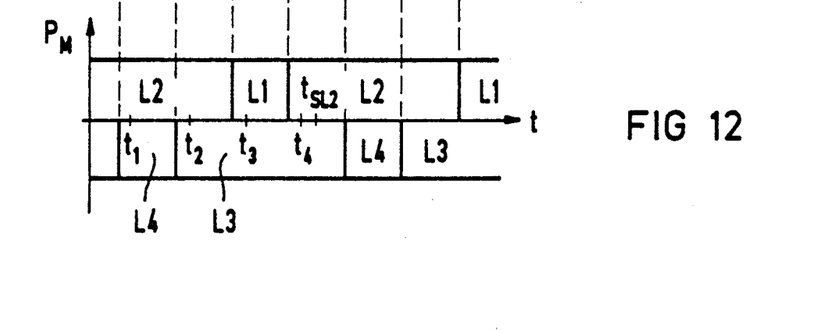

FIGS. 5 to 8 and FIGS. 9 to 12 explain in greater detail the method for reducing a current break in a leg R, S or T that is not participating in the commutation for clockwise and counterclockwise rotation of the synchronous machine 2. The current flows here, prior to the commutation, via the legs R, and S and after the commutation via the legs R and T. Referring to one period of the sampling voltage $u_D$, the commutation can begin every time at individual times $t_1$ to $t_4$. Three different pulse patterns are thereby obtained as shown in FIGS. 8 and 12, respectively. In addition, different voltages are then present at the down commutating leg S, which drives the current break in the up direction in the down commutating leg S. Table 1 shows that at the individual times $t_1$–$t_4$ for the corresponding pulse patterns the physical current path and the driving voltage present at the down commutating leg S for the two cases of "clockwise rotation, current flow via the legs R and S" and of "clockwise rotation, current flow via the legs R, S and T". The symbol + and − respectively mean that the corresponding legs of the synchronous machine 2 are connected to the positive bus bar and to the negative bus bar of the intermediate link of the converter 8. The intermediate link is not shown in FIGS. 1 and 2 for reasons of clarity. Only the symbols + and − are shown at the converter 8 for the same reason.

TABLE 1

|  |  | Clockwise = $+u_{St}$ Current flow via R and S before comm'n |  | Clockwise = $+u_{St}$ Current flow via R, S, T during comm'n | driving voltage at leg S |
|---|---|---|---|---|---|
| $t_1$ | L2,L4 | lower bypass: R and S at − intermed. link | L2,L4 | lower bypass: R and T − intermed. lk. S + intermed. lk | $\frac{2}{3} U_d$ |
| $t_2$ | L1,L4 | Current buildup: R + intermed. link S − intermed. link | L1,L4 | Current buildup: R,S + intermed. link T − intermed. link | $\frac{1}{3} U_d$ |
| $t_3$ | L1,L3 | upper bypass: | L1,L3 | upper bypass: | EMF |

TABLE 1-continued

|  |  | Clockwise = +u$_{St}$<br>Current flow via R<br>and S before comm'n |  | Clockwise = +u$_{St}$<br>Current flow via R,<br>S, T during comm'n | driving<br>voltage<br>at leg S |
|---|---|---|---|---|---|
| t$_4$ | L1,L4 | R,S + intermed. lk<br>Current buildup:<br>R + intermed. link<br>S − intermed. link | L1,L4 | R,S,T + intermed. lk<br>Current buildup:<br>R and S + intermed.<br>lk. T − intermed. lk | ⅓ U$_d$ |
| t$_{SR1}$ | L1,L4 | Current buildup:<br>R + intermediate 1<br>S − intermediate 1 | L1,L4 | Current buildup:<br>R and S + intermed. lk.<br>T − intermed. lk | ⅓ U$_d$ |
| t$_{SR2}$ | L1,L4 | Current buildup:<br>R + intermed. link<br>S − intermed. link | L1,L4 | Current buildup:<br>R and S + intermed. lk.<br>T − intermed. lk. | ⅓ U$_d$<br>⅓ U$_d$ |

Table 2 shows the individual times t$_1$–t$_4$ for the pulse patterns, the physical current path and the driving voltage present at the down commutating leg S for the two cases of "counterclockwise rotation, current flow via legs R and S" and of "counterclockwise rotation, current flow via the legs R, S and T". The symbols + and −, respectively, here mean that the corresponding leg of the synchronous machine 2 is connected to the positive bus bar and the negative bus bar of the intermediate link of the converter 8. The intermediate link is not shown in FIGS. 1 and 2 for reasons of clarity. Only the symbols + and − are shown at the converter 8 for the same reasons.

Tables 1 and 2 show that the driving voltage fluctuates at the down commutating leg S. Accordingly, the current in leg S is commutated down at different speeds and the current in the leg T is commutated up at different speeds. Current breaks or current spikes which have different amplitudes are therefore generated for each commutation on the leg R that is not participating in the commutation.

Figure 5:
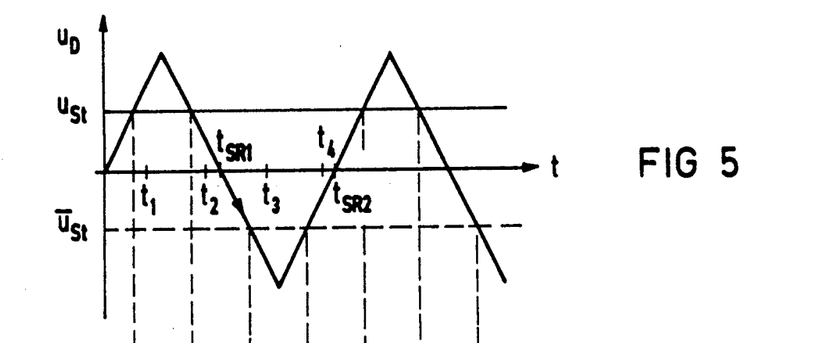
FIGS. 5 and 9 show a plot of a sampling voltage versus time with the superimposed control voltages for the direction of rotation "clockwise by motor" and the direction of rotation "counterclockwise by motor", respectively.

The circuit arrangement shown in FIG. 1 achieves a simple method of synchronizing the sampling voltage u$_D$ in which it starts from zero volts with a positive or negative slope for every commutation. FIG. 5 in conjunction with Table 1 indicate that, in effect, the pulse

TABLE 2

|  |  | Clockwise = −u$_{St}$<br>Current flow via R<br>and S before comm'n |  | Clockwise = −u$_{St}$<br>Current flow via R,<br>S, T during comm'n | driving<br>voltage<br>at leg S |
|---|---|---|---|---|---|
| t$_1$ | L2,L4 | lower bypass:<br>R and S at −<br>intermed. link | L2,L4 | lower bypass:<br>R,S and T − intermed.<br>lk. | EMF |
| t$_2$ | L2,L3 | Current buildup:<br>R − intermed. link<br>S + intermed. link | L2,L3 | Current buildup:<br>R and S − intermed. link<br>T + intermed. link | ⅓ U$_d$ |
| t$_3$ | L1,L3 | upper bypass:<br>R,S + intermed. lk | L1,L3 | upper bypass:<br>R and T + intermed. lk<br>S − intermed. link | ⅔ U$_d$ |
| t$_4$ | L2,L3 | Current buildup:<br>R − intermed. link<br>S + intermed. link | L2,L3 | Current buildup:<br>R and S − intermed. lk.<br>T + intermed. link | ⅓ U$_d$ |
| t$_{SR1}$ | L2,L3 | Current buildup:<br>R − intermed. link<br>S [+] intermed. link | L2,L3 | Current buildup:<br>R and S − intermed. lk.<br>T + intermed. link | ⅓ U$_d$ |
| t$_{SR2}$ | L2,L3 | Current buildup:<br>R − intermed. link<br>S + intermed. link | L1,L3 | Current buildup:<br>R and S − intermed. lk<br>T + intermed. link | ⅓ U$_d$ |

In addition, the pulse pattern, the physical current path and the driving voltage present at the down commutating leg S are given at the synchronizing instant t$_{SR1}$ and t$_{SR2}$ as well as t$_{SL1}$ and t$_{SL2}$.

The individual pulse patterns shown in FIGS. 8 and 12 are obtained as follows. The control voltage u$_{St}$ of the current controller 28 is positive or negative for clockwise rotation and counterclockwise rotation respectively. This control voltage is used to generate a second inverse control voltage u$_{St}$. Both control voltages, +u$_{St}$, u$_{St}$ and −u$_{St}$, u$_{St}$, are compared with the sampling voltage u$_D$ of the pulse frequency generator 12 in the pulse width modulator 14. The pulse width modulated squarewave signals u$_{P1}$ and u$_{P2}$ are then present at the outputs of the pulse width modulators 14 as shown in FIGS. 6 and 7 as well as in FIGS. 10 and 11. The pulse distribution logic circuit 16 generates the pulse pattern according to FIGS. 8 and 12, respectively, at the two current carrying legs as a function of the binary position signal of the rotor position transmitter 6.

distribution logic 16 generates the pulse pattern L1, L4 at the time t$_{SR1}$ and the pulse pattern L1, L4 at the time t$_{SR2}$. Both pulse patterns are equal at the start of the commutation, but the following pulse patterns already differ.

The pulse pattern L1, L4 is followed from time t$_{SR1}$ by the pulse pattern L1, L3, i.e., after the current buildup via the thyristor T1, T6 there follows a current decrease via the upper bypass through the thyristor T1, T5 where only the electromotive force (EMF) of the synchronous machine 2 is present. At instant t$_{SR2}$ the pulse pattern L1, L4 is followed by the pulse pattern L2, L4. In effect, a current decrease via the lower bypass through the thyristors T1, T6 follows after the current buildup via the thyristors T1, T6, whereas the driving voltage, ⅔ of the value of the intermediate link voltage u$_d$, is present as the driving voltage at the down commutating leg S. It follows that sampling voltage u$_d$ is present when the commutation begins at the synchronizing time. It also follows that if the commutation begins at the synchronizing instant $t_{SR2}$, the current in the leg S commutates down faster as compared with a commutation at the synchronizing instant $t_{SR1}$. Different current breaks thereby come about on the leg R that is not participating in the commutation. These current breaks, however, have the same amplitude at the start of every commutation and thereby reduce the ripple of the total current or the torque over several periods of the terminal voltage of the synchronous machine 2.

The method of synchronizing the sampling voltage $u_D$ in the circuit arrangement shown in FIG. 2 synchronizes the sampling voltage $u_D$ at the instant $t_{SR1}$ for clockwise rotation of the synchronous machine 2 and at the instan $t_{SL2}$ for counterclockwise rotation of the synchronous machine 2. It follows that the same pulse patterns continuously follow each other from synchronizing times $t_{SR1}$ and $t_{SL2}$ for clockwise as well as for counterclockwise rotation.

The beginning of the commutation starts with the pulse pattern "current buildup via the thyristors T1, T6, and T2, T5, respectively". This step is followed by the pulse pattern "current decrease via the upper bypass through thyristors T1, T5 with the driving voltage EMF" or "current decrease via the lower bypass through thyristors T2, T6 with the driving voltage EMF". This step is again followed by the pulse pattern "current buildup via the thyristors T1, T6 and T2, T5". All commutations thus become uniform. In addition, the current change takes place slowly since only the EMF is present as the driving voltage at the legs R, S and T. The subordinate current controller 28 is thus given the opportunity to act on the commutation. Thus, all the current breaks onto the legs R, S and T which are not participating in the commutation become equal and are decreased further from the amplitudes produced by simple synchronization, whereby the ripple of the total current or the torque is substantially reduced.

What is claimed is:

1. A method for operating a synchronous machine having a means for picking up a rotor position of the machine to provide a reference signal for the start of commutation, the method comprising the steps of:
    forming a control voltage using comparators and controllers corresponding to a speed reference value;
    comparing the control voltage with a triangular high frequency sampling voltage generated with a generator;
    generating a pulse-width modulated signal in a pulse width modulator from said comparison;
    determining with the pulse width modulated signal, in a pulse distribution logic circuit, leg currents for the synchronous machine;
    shorting the sampling voltage at the start of commutation for a brief synchronizing time relative to the period of the sampling voltage to prevent a current break in the leg of the machine not taking part in the commutation.

2. A method as claimed in claim 7, wherein the step of generating the sampling voltage with the pulse frequency generator comprises the steps of applying a negative control voltage to a Schmitt trigger of the pulse frequency generator to generate a positive control voltage during the synchronization time period and applying a positive control voltage to the Schmitt trigger to generate a negative control voltage.

3. A circuit arrangement according to claim 8 wherein said synchronous machine is a three phase block current fed synchronous machine having three stator legs, the circuit reducing a break current in any one of the legs that is not participating in a commutation while two other legs are participating in the commutation, comprising:
    a converter for supplying current to each of the legs;
    a control unit for controlling the converter, the control unit having a pulse frequency generator for generating triangular high frequency pulses to the legs, a pulse width modulator coupled to the converter and a pulse distribution logic circuit coupled to the converter for distributing pulses to the converter;
    a tachometer for determining the speed of the synchronous machine and generating an output signal indicative thereof;
    a speed controller connected to receive the output signal of the tachometer;
    a rotor position transmitter for generating signals indicative of a position of the rotor as an output;
    a commutation indicator connected to the output of the rotor position transmitter for determining the start of a commutation;
    a synchronization stage having an input connected to an output of the commutation indicator for generating a squarewave signal having a predetermined logical value for a synchronization time period, the squarewave signal supplying an input to the pulse frequency generator;
    means for forming a current reference value from the current in the two legs participating in the commutation; and
    a current controller having an input that supplies a signal indicative of both an output of the speed controller and an output of the reference current forming means, the current controller supplying an input to the pulse width modulator.

4. A circuit arrangement as claimed in claim 3, further comprising:
    a sign indicator for indicating a sign of the output of the current controller; and
    a first switch having as an input the output of the sign indicator, the first switch having an output connected to an input to the pulse frequency generator of the control unit, the first switch being operated by the synchronization stage.

5. A circuit arrangement as claimed in claim 3, wherein:
    the synchronization stage further comprises an EXNOR gate having first and second inputs, the first input being connected directly to the input to the synchronization stage; and further comprising:
    a time delay stage connected in series between the input to the synchronization stage and the second input connected to the EXNOR gate; and
    the pulse frequency generator further comprising a second switch connected to the output of the EXNOR gate of the synchronization stage, and an integrator connected in parallel with an output of the second switch.

6. A circuit arrangement as claimed in claim 5, further comprising:
    a negatively flank-triggered monostable multivibrator that has an input connected to the output of the EXNOR gate and an output connected to operate the first switch; and
    a Schmitt trigger connected to an output of the first switch.

7. A circuit arrangement for operating a synchronous machine having means for picking up a rotor position of the machine to provide a reference signal for the start of commutation, comprising:
- means for forming a control voltage using comparators and controllers corresponding to a speed reference value;
- a generator generating a triangular high frequency sampling voltage;
- means for comparing the control voltage with the triangular high frequency sampling voltage from said generator;
- means for generating a pulse-width modulated signal in a pulse width modulator from the result of said comparing step;
- means for determining with the pulse width modulated signal, in a pulse distribution logic circuit, leg currents for the synchronous machine;
- means for shorting the sampling voltage at the start of commutation for a brief synchronizing time relative to the period of the sampling voltage to prevent a current break in the leg of the machine not taking part in the commutation;
- wherein an integrator and a Schmitt-trigger switching step are coupled to said generator; said means for shorting the sampling voltage shorting the integrator.

* * * * *